Nov. 12, 1968  R. O. JENSON  3,410,579

TOWBAR QUICK-LATCH

Filed July 13, 1966

*INVENTOR.*
RENOLD O. JENSON

BY  *C. Harvey Held*

HIS ATTORNEY 3,410,579
TOWBAR QUICK-LATCH
Renold O. Jenson, 621 Kensington Ave.,
Salt Lake City, Utah 84105
Filed July 13, 1966, Ser. No. 564,896
10 Claims. (Cl. 280—491)

ABSTRACT OF THE DISCLOSURE

A quick-latch for towbars having a pair of convergently arranged struts connected together at their point of convergence and journaled at their opposite ends to the bumper of a traction vehicle, which includes a towbar support member attached to the bumper of the vehicle for supporting the towbar in a guard position, attaching means affixed to the support member for attaching the towbar to the support member, locking means attached to the towbar in coacting relationship with said attaching means for quick-locking the towbar to the attaching means, and bumper means attached to the converging struts for holding the struts at a position spaced apart from the support member when the struts are in their guard position.

---

This invention relates to a towing device for traction vehicles and in particular, to a quick-lock means adapted to be mounted on towbars attached to the front end of traction vehicles such as pickup trucks, jeeps, etc., which quick-locks said towbars in a guard position on said vehicles.

It is often desirable to use four-wheel drive vehicles such as Jeeps or pickup trucks in remote areas which are located many miles from the residence of the user of said vehicles. As a result, it has become very popular to tow the four-wheel drive vehicle to said remote areas by faster and more comfortable traction vehicles such as conventional passenger vehicles. To accomplish this purpose, a towbar is mounted to the front end of the vehicle to be towed, e.g., to the bumper of said vehicle, and also to the rear of the traction vehicle. It is important that the towbar not only have longitudinal pulling capacity but also that it have sufficient stiffness to keep the vehicles properly spaced and allow the towed vehicle to be self-steering. Since a towbar having these attributes is generally heavy and quite cumbersome, it is desirable to journal said towbar to the front of the vehicle to be towed and when the towbar is not in use, it is swung to a substantially vertical guard position, where it is secured to said vehicle. There has been a long felt need for a towbar that is easily attachable to and detachable from said guard position by quick-lock means thereby obviating the necessity to bolt and unbolt said towbar from the guard position every time it is used.

It is accordingly an object of my invention to provide a towbar quick-latch means which overcomes the objections and disadvantages heretofore found in such devices.

It is another object of my invention to provide a towbar for traction vehicles that locks into a vertical guard position.

Another object of my invention is to provide lock means for towbars that quick-locks said towbars in a vertical guard position and which is adapted to easily release said towbar from said guard position.

Still other objects of my invention will become more apparent to those skilled in the art as the invention is better understood by reference to the detailed description and drawings appearing hereinafter.

The foregoing objects and attendant advantages of my invention may be achieved by providing quick-lock means adapted to be attached to a towbar which is attached to the bumper of a vehicle. The towbar generally comprises a pair of convergentally arranged struts journaled to said bumper. The struts are connected together at their point of convergence with means for attaching said struts to the rear of a towing vehicle such as a passenger automobile. The quick-lock means comprises a vertically extending support member attached to the bumper of the vehicle at a point which is midway between the ends of the towbar struts which are journaled to said bumper. Latching means are connected to said vertically extended member, at a position proximate its top end, which coact with locking means attached to the towbar, when said towbar is moved to a guard position. Said lock is provided with releasing means for releasing said struts from said guard position when it is desired to shift the towbar to a towing position.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

Figure 1:
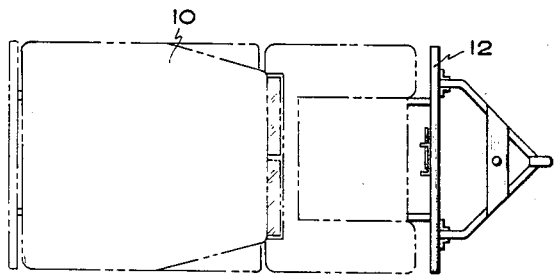
FIGURE 1 is a top view of a traction vehicle with the towbar of my invention attached to the front bumper of said vehicle and extended in a horizontal tow position.
Figure 2:
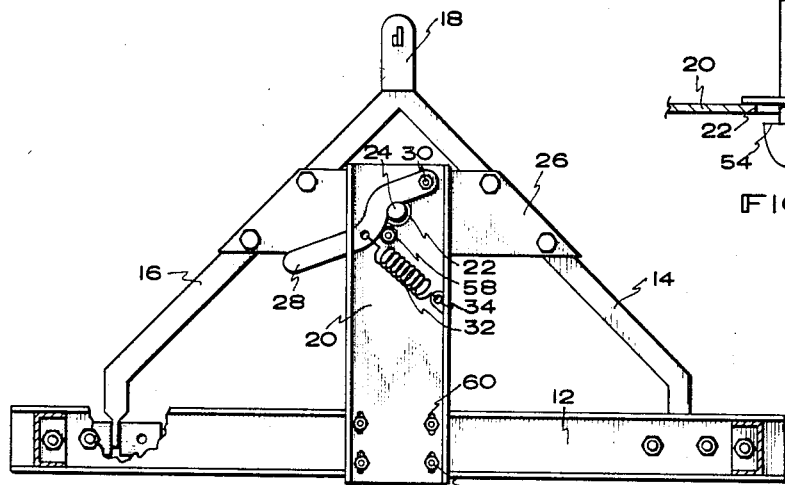
FIGURE 2 is a plan view of a towbar in its vertical guard position and showing my latching means used to quick-lock said towbar in said guard position.

Referring now more particularly to the drawings, FIGURE 1 shows a traction vehicle 10 with a towbar and the quick-lock means of my invention attached to front bumper 12 of said traction vehicle. The towbar is extended in a horizontal towing position. As shown in FIGURE 2, converging struts 14 and 16 are journaled to bumper 12 by conventional journaling means, hereinafter described. Hitching means 18 are attached to struts 14 and 16 at their point of convergence for connecting said struts to a traction vehicle used for towing. Latch support member 20 is rigidly attached to bumper 12 proximate said bumper's center and substantially midway between the ends of struts 14 and 16 which are journaled to said bumper 12. Said support member 20 extends vertically upward from said bumper and aperture 22 is provided therein proximate its top end which aperture coacts with spearhead keeper 24, hereinafter described. Support plate 26 is secured to converging struts 14 and 16 between the opposite ends and is positioned to support said spearhead keeper 24 substantially perpendicular to the plane formed by converging struts 14 and 16 and in coacting relationship with aperture 22. Said support member 20 is preferably provided with adjusting means such as slots 60 which coact with nuts and bolts 62 which pass through bumper 12, for positioning aperture 22 in coacting relationship with spearhead keeper 24. This type of construction enables my quick-latch to be adapted to any conventional towbar. Latch 28 is pivotly mounted to support member 20 by conventional rotation means 30 and is positioned to coact with spearhead keeper 24 to lock struts 14 and 16 in an upright guard position. Biasing means 32 is connected to support 20 by bracket 34 and to latch 28 thereby urging said latch 28 into locking relationship with spearhead keeper 24.

Figure 3:
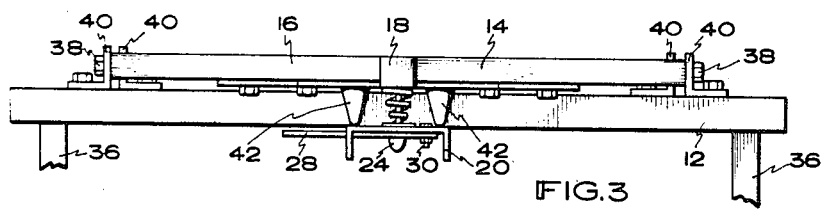
FIGURE 3 is a top view of the towbar and quick-lock means shown in FIGURE 2.

As shown in FIGURE 3, bumper 12 is attached to the frame of traction vehicle 10 by supports 36 which are spaced apart from each other. Struts 14 and 16 are journaled to said bumper 12 with bolts 38 which pass through mounting brackets 40, attached to front bumper 12, and the ends of said struts 14 and 16. When the towbar of my invention is in a locked position, resilient bumpers 42, connected to support plate 22, are forced against vertically extending support member 20 to hold struts 14 and 16 at a position spaced apart from said support plate 26 and aid in keeping said struts in a locked position, as hereinafter described.

Figure 4:
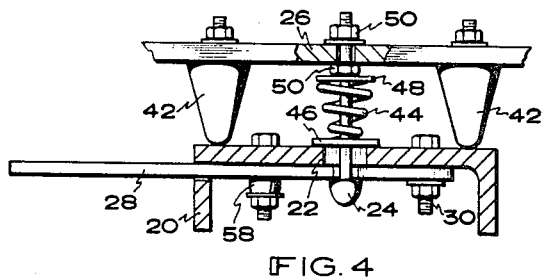
FIGURE 4 is an enlarged top view of the preferred quick-lock of my invention used in combination with a towbar.

An enlarged view of the quick-lock means of my invention is shown in FIGURE 4. Latch 28 is positioned so that the enlarged head of spearhead keeper 24, hereinafter described, is resting against the outside surface of said latch 28 and is thereby prevented from moving through aperture 22 in supporting member 20. Biasing means such as compressed spring 44 is positioned between washers 46 and 48 on spearhead keeper 24 to urge said washer 44 against the face of supporting member 20 and to therein hold the enlarged head of spearhead keeper 24 securely against the face of latch 28. Said spearhead keeper 24 is attached to support plate 26 by nuts 50, positioned on opposite sides of said support plate and at a position on said spearhead keeper 24 so that said keeper urges resilient bumpers 42 against the face of supporting member 20 when converging struts 14 and 16 are in a guard position. Said resilient bumpers 42 may be constructed from any material that has a resilient characteristic, i.e., material that will change its shape when pressure is applied thereon, such as rubber, plastic, leather, etc.

Figure 5:
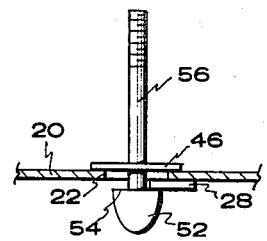
FIGURE 5 is an enlarged plan view of the spearhead keeper which coacts with the latch shown in FIGURE 4.

Spearhead keeper 24 is shown in detail in FIGURE 5. Said keeper is provided with enlarged head 52 which has a substantially plane back surface 54 which surface is connected proximate its center to elongated shaft 56. In the figure, washer 46 is shown slidably mounted on shank 56 and the relative size of head 52 in relation to washer 46 is shown. Enlarged head 52 is sized to pass through aperture 22 in supporting member 20 whereas washer 46 is sized to coact with the surface of said supporting member 20 and not pass through said aperture 22, i.e., it is larger than said port 22. Latch 28 is positioned between face 54 of head 52 and the face of supporting member 20 adjacent to said face 54 to prevent head 52 from passing through aperture 22. For purpose of clarity in FIGURE 4, supporting member 20 is shown partially broken away so that said aperture 22, and its relationship to washer 46 and face 54 of spearhead keeper 24, can be clearly seen.

In operating the towbar of my invention, a conventional vehicle 10 such as a Jeep, wagon, automobile, etc., is towed by a traction vehicle by merely rotating converging struts 14 and 16 to a substantially horizontal position as shown in FIGURE 1 and attaching hitching means 18 to the rear of the traction vehicle by any of the well known methods. When it is no longer desired to tow vehicle 10, hitching means 18 is released from the traction vehicle and converging struts 14 and 16 are swung to a substantially vertical position wherein spearhead keeper 24 attached to said struts passes through aperture 22 in supporting member 20. The sloping face of enlarged head 52 acts as a cam for latch 28 which rides thereon until surface 54 of enlarged head 52 passes beyond latch 28 wherein said latch 28 is urged by biasing means 32 to a position between said surface 54 and support 20 as shown in FIGURE 5. Stop 58 holds latch 28 in coacting relationship with enlarged head 52 when said spearhead keeper 24 is not coacting with said latch 28. To release struts 14 and 16 to a tow position, latch 28 is rotated away from between surface 54 and support 20 wherein biasing means 44 urges enlarged head 52 of spearhead keeper towards washer 46 and through aperture 22.

It is to be noted that it is within the scope of my invention to reverse the position of the quick-lock components of my invention, i.e., spearhead keeper 24 may be attached to support 20; aperture 22, and latch 28 may be attached to converging struts 14 and 16; and resilient bumpers 42 may be connected to either support 20 or converging struts 14 and 16. Such a reversal of components is considered to be an obvious modification of my invention. The phrases "locking means" and "attaching means" as used herein refer to any means, alone or in combination, which locks or attaches converging struts 14 and 16 to vertically extending support 20.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed.

I claim:

1. In combination with a vehicle having a towbar which includes a pair of convergently arranged struts connected together at their point of convergence and journaled at their opposite ends to the bumper of said vehicle, a quick-latch mount which comprises support means attached to said bumper for supporting said towbar in a guard position; attaching means affixed to said support means for attaching said towbar to said support means; locking means attached to said towbar in coacting relationship with said attaching means for quick-locking the towbar to said attaching means; and bumper means attached to said converging struts in a coacting relationship with said support means for holding said struts at a position spaced apart from said support means when said struts are in said guard position locked to said support means.

2. The combination of claim 1 wherein said attaching means comprises a spearhead keeper having an elongated shaft end and an enlarged head end; and said locking means comprises an aperture positioned in said support means to coact with said enlarged head end of said spearhead keeper and latch means pivotly mounted on said support means in coacting relationship with said aperture wherein said enlarged head end of said spearhead keeper moves through said aperture when said towbar is moved to said guard position and said enlarged head end of said spearhead keeper is prevented from passing back through said aperture when said latch is positioned between said support means and said enlarged head.

3. The combination of claim 1 wherein said bumper means are attached to said support means in coacting relationship with said converging struts for holding said struts at a position spaced apart from said support means when said struts are in said guard position locked to said support means.

4. The combination of claim 1 wherein said locking means comprises a spearhead keeper having an elongated shaft end and an enlarged head end; and said attaching means comprises an aperture positioned in said support means to coact with said enlarged head end of said spearhead keeper and latch means pivotly mounted on said support means in coacting relationship with said aperture wherein said enlarged head end of said spearhead keeper moves through said aperture when said towbar is moved to said guard position and said enlarged head end of said spearhead keeper is prevented from passing back through said aperture when said latch is positioned between said support means and said enlarged head.

5. The combination of claim 4 wherein biasing means are positioned on the shank end of said spearhead keeper to urge said enlarged head end of said spearhead keeper to pass outwardly through said aperture when said latch is moved away from between said enlarged head end of said spearhead keeper and said support means.

6. The combination of claim 5 wherein said biasing means comprises a compressed spring, having a first end and a second end, positioned around the elongated shank end of said spearhead keeper wherein said first end of said spring is positioned to urge outwardly against said struts and said second end of said spring is positioned to urge outwardly against elongated washer means slidably mounted on said shank end of said spearhead keeper and positioned adjacent to said enlarged head end of said spearhead keeper.

7. The combination of claim 6 wherein said bumpers are resilient.

8. The combination of claim 4 wherein biasing means are connected to said latch and to said support means for urging said latch into coacting relationship with said spearhead keeper.

9. The combination of claim 8 wherein latch stop means are attached to said support means for holding said latch means in coacting relationship with the enlarged head end of said spearhead keeper.

10. The combination of claim 4 wherein said enlarged head end of said spearhead keeper is provided with a curved cam surface and said latch is positioned to slide on said curved cam surface as said enlarged head moves past said latch.

References Cited

UNITED STATES PATENTS

| | | | |
|---|---|---|---|
| 2,302,957 | 11/1942 | Rhodes | 292—340 |
| 2,378,504 | 6/1945 | Roos | 280—491 |
| 2,723,552 | 11/1955 | Dlugatch | 70—240 |
| 2,830,829 | 4/1958 | Gensinger | 280—491 |
| 2,841,430 | 7/1958 | Krause | 292—228 X |
| 2,880,016 | 3/1959 | Peterson | 280—491 |

LEO FRIAGLIA, *Primary Examiner.*